Nov. 16, 1937.   S. C. VINCENT ET AL   2,099,583
FLASHER MOTOR UNIT
Filed Feb. 25, 1935   3 Sheets-Sheet 1
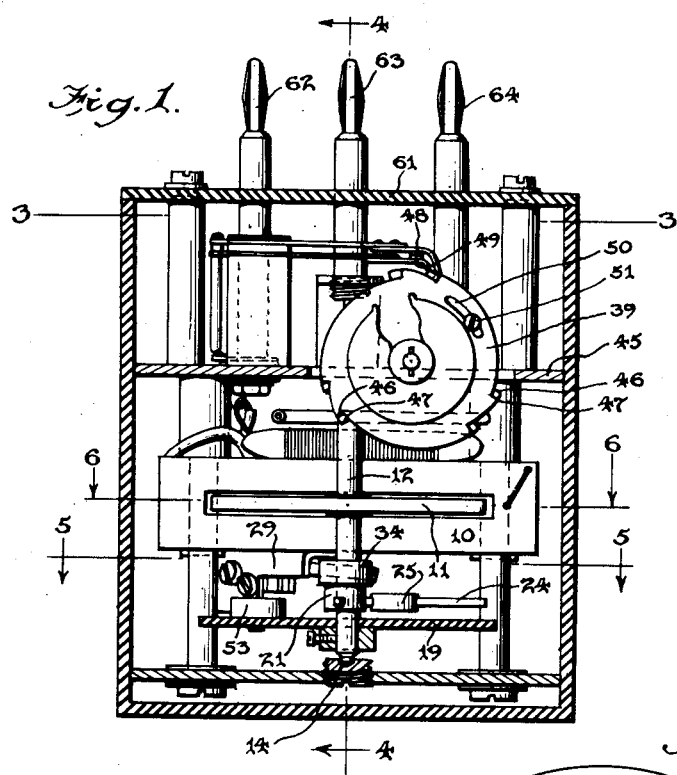
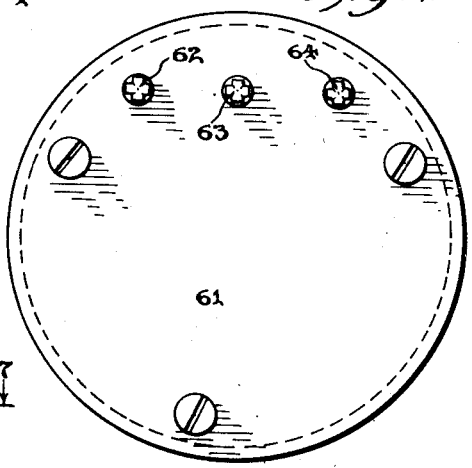
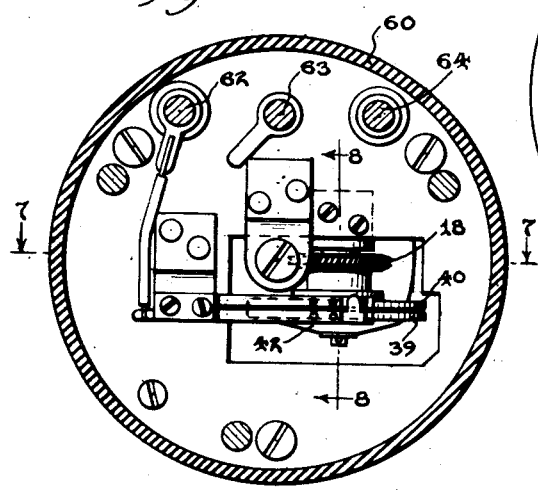
Inventors
Sidney C. Vincent and
Frederick C. Volkman,
By Harold L. Huggins
Attorney Nov. 16, 1937. 2,099,583
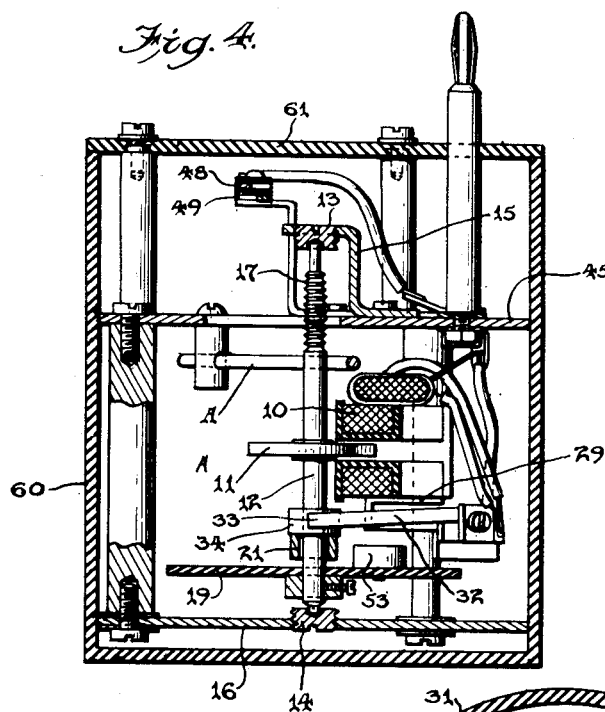
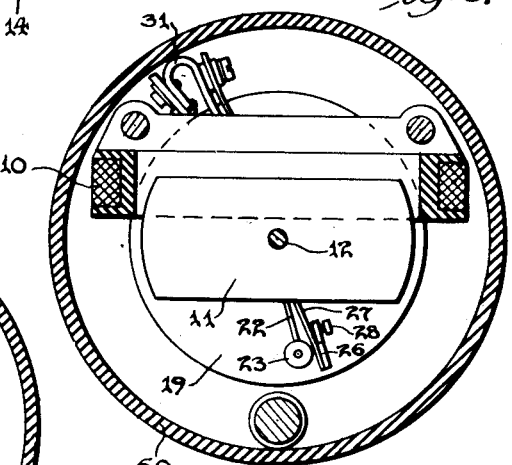
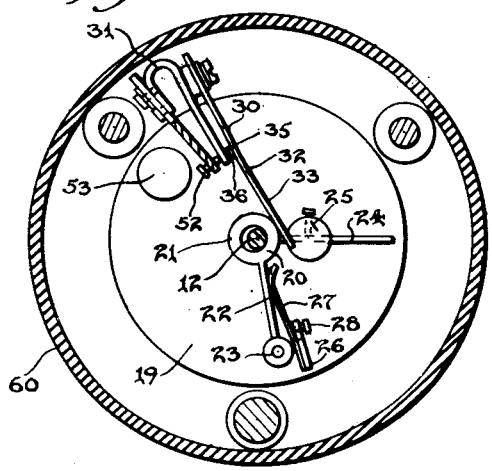
Inventors
Sidney C. Vincent and
Frederick C. Volkman,
By Harold S. Huggins
Attorney Nov. 16, 1937. S. C. VINCENT ET AL 2,099,583
FLASHER MOTOR UNIT
Filed Feb. 25, 1935 3 Sheets-Sheet 3
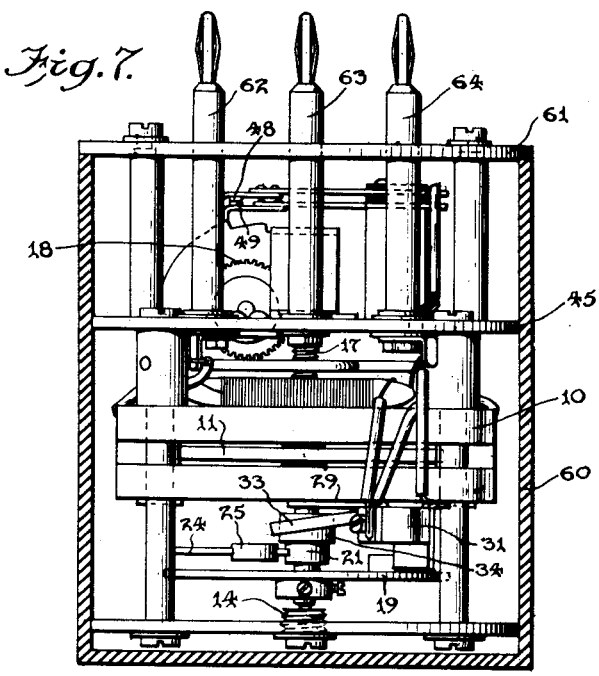
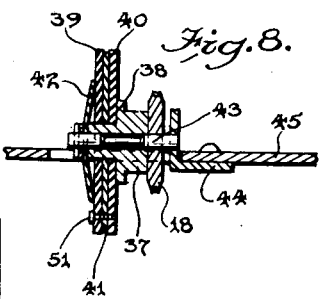
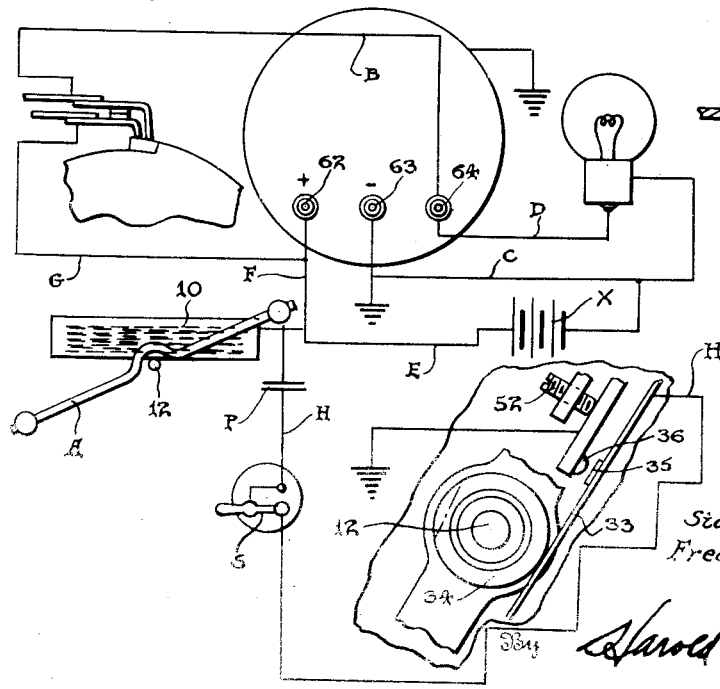
Inventors
Sidney C. Vincent and
Frederick C. Volkman,
Harold S. Huggins
Attorney Patented Nov. 16, 1937

2,099,583

UNITED STATES PATENT OFFICE 2,099,583

FLASHER MOTOR UNIT

Sidney C. Vincent and Frederick C. Volkman, Baltimore, Md.

Application February 25, 1935, Serial No. 8,182

9 Claims. (Cl. 171—222)

This invention relates to a flasher motor unit used primarily for airport and lighthouse purposes but capable of being employed for many other needs wherein the requirements specify economy and efficient service for an extended period of time.

For flasher beacons, the rate of energy consumption must be very small so as to permit it to operate on dry batteries. At the same time, the flashing time or cycle must not vary even for a very large change of the battery voltage. The adjustable mechanism for controlling the speed of the motor must be permanent and easily made and sensitive. The motor must have a good torque characteristic to prevent sticking and come up to speed very quickly. The mechanism connected to the shaft of the rotor must be of such a design as to reduce friction and secure positive action on the characteristic cams which control the lighting cycles. The unit must be capable of easy removal of the rotating element and the speed control mechanism. Such are the characteristics of this invention which is designed to withstand the comparatively hard usage without interference with its efficiency and low cost operation.

Other objects and advantages will become apparent as the novel features of this invention are more fully hereinafter disclosed.

Referring more particularly to the drawings,

Fig. 1 is an elevation of the motor unit assembly showing the casing in section;

Fig. 2 is a plan view;

Fig. 3 is a section taken on lines 3—3 of Fig. 1;

Fig. 4 is an elevation at right angles to Fig. 1;

Fig. 5 is a section taken on lines 5—5 of Fig. 1;

Fig. 6 is a section taken on lines 6—6 of Fig. 1;

Fig. 7 is a section taken on lines 7—7 of Fig. 3 showing operating mechanism in elevation;

Fig. 8 is a section taken on lines 8—8 of Fig. 3, and,

Fig. 9 is a diagrammatic view of the complete flasher circuit.

The motor unit comprises a stationary electromagnetic unipolar field or stator and a rotor. The unipolar field is composed of a single coil or electromagnet 10 which supplies the energy to the rotor 11 and is non-symmetrical in regard to the rotating element. The rotor is of the permanent magnet type with its axis placed in the magnetic field beyond the center of symmetry, as clearly shown in Figs. 4 and 6. There is a very definite advantage of placing the rotor in this position because of the high starting torque and the ability of applying the energy to the rotor during a comparatively small element of arc of rotation. It is well known that the torque is directly proportional to the gradient of magnetic flux with reference to the angle of rotation. The present invention makes the gradient large from the starting position. The starting position of the rotor 11 is always the same in the present invention due to the aid of the auxiliary magnet A. The magnet A is so positioned with respect to the rotor, that it maintains the rotor when at rest, in a position with respect to the field coil that the greatest torque is available when the motor is started, thereby affording a high starting torque over a small working range. By making the torque high in a small working range and always starting the rotor from the same position of rest, uncertainty of starting with feeble power is avoided because the maximum of rotational energy is quickly imparted to the rotor.

The rotor 11 is secured to a shaft 12 journalled at its extremities in bearings 13 and 14, each of which is externally threaded so as to be capable of being advanced into or withdrawn out of the corresponding supporting members 15 and 16. The shaft of the rotor is made of large diameter which permits cutting a threaded worm portion 17 directly on the shaft and thereby avoids making a separate worm. Also, with this arrangement, a worm wheel 18 is all that is required for complete reduction of speed. Furthermore, with the shaft 12 not being enclosed by exciting coils by the use of a unipolar construction, the rotor can be removed without disturbing the operating coil 10 which greatly simplifies making repairs to the rotating element and permits a quick and easy removal and also the same quick and easy replacement of another rotating element if required. This easy removal of the rotating unit is accomplished by loosening the top and bottom bearings 13 and 14 to the extent that the ends of the shaft 12 may be readily withdrawn therefrom.

A speed control disc 19 constitutes a portion of the rotating element which serves three purposes, namely, it serves to smooth out the impulse of rotations, serves to dynamically balance the rotor so that it rotates without vibration by having proper counterweights on the circumference, and also serves as a structure for supporting the unitary floating speed control mechanism indicated in its entirety at 20. This speed control means consists of a collar member 21 surrounding the rotor shaft 12 and, extending therefrom is an integral arm 22 which is pivoted at 23 to the governor disc 19. The collar member 21 has an internal diameter greater than the external diameter of the rotor shaft 12 which permits an independent floating action about the shaft 12, due to this collar member 21 being pivoted at 23 on the disc. Another arm 24, integral also with the collar member 21, extends outwardly therefrom and is provided thereon with an adjustable weight 25 adapted to be regulated on said arm to control the speed of the rotor shaft 12. A bracket 26 is attached to the governor disc 19 and is adapted to support a spring member 27, the tension of which, upon the arm 22, is regulated by means of the set screw 28. It is therefore apparent that by regulating the pressure of spring member 27 on the arm 22, the tension on the unitary floating speed control mechanism can be controlled.

Secured to the coil 10 by a suitable bracket 29 or other desirable means of support, is a motor contact unit 30 which consists of a body member 31. Insulated from the body member 31 is a resilient contact member 32, the end portion 33 of which is in constant contact with 34 on the collar member 21. This collar 34 is made of ebony because it has proven to be the best material for the present purpose. The floating speed control mechanism which rotates with the shaft 12 also has an independent transverse arcuate movement relative to the rotation of said shaft and the end portion 33 of the spring contact member 32 being in constant connection with member 34 on the collar 21 permits the opening or closing of the motor circuit through the contacts 35 and 36 on the motor contact unit, depending on the speed of the shaft 12. This contact with the floating speed control mechanism permits the power to be applied for various intervals of time depending upon the strength of the battery. The natural period of the cantilever spring and the counter-weight is such that the natural period of variation of the speed control mechanism is small compared to the speed of rotation, thereby preventing compound oscillations and shunting of the motor.

It is possible to use large eccentrics for cutting off the current which permit position adjustments of governing within shorter angles of rotation in which power is applied and thereby eliminates unsteady rotations due to lack of uniformity of the governor control due to small eccentrics. Furthermore, it permits the speed of rotation to remain uniform over a very wide change of voltage because of the great excentricity of the current cut off operating upon a centrifugal mechanism which functions on a short arc of contact and the changes of speed are more erratic due to lack of determined position at which the power supplied is controlled. However, even eccentrics are not the most satisfactory means of eliminating the unsteady rotations due to lack of uniformity of the governor control. This invention, however, eliminates the unsteady rotations due to lack of uniformity of the governor control by providing a speed control disc on which is pivotally mounted a unitary speed control mechanism surrounding the rotor shaft and capable of having an independent floating arcuate movement transversely of the rotation of the rotor shaft 12. This speed control mechanism is provided with a larger internal diameter than the external diameter of the rotor shaft and in effect, accomplishes the results aforementioned with respect to the use of large eccentrics. In a state of rest, the speed-control member assumes an eccentric position with respect to the rotor shaft. However, as the shaft speeds up, the speed control means assumes a concentric position around the rotor shaft and thereby breaks the circuit to the motor contact unit and when the shaft speed is retarded, it assumes its eccentric position to close the circuit to the motor unit.

The shaft 12 being provided on its ends with the threaded portion 17 permits meshing with a worm wheel 18 which is secured to a spindle 37. Held in frictional engagement with a shoulder 38 of the spindle 37 are two aligned characteristic cam faced disc members 39 and 40 which are separated by the insulating member 41. This frictional engagement is effected by means of the spring washer member 42. The spindle 37 is rotatively supported on the shaft 43 which in turn is carried by the bracket 44 on the plate 45. The disc members 39 and 40 are the means for determining the characteristics of the flash of light and are provided on their outer peripheral edges with cam steps 46 and 47, the cam steps of one disc being in advance of the steps of the adjacent disc to thereby permit a periodic make and break of the circuit contact switch members 48 and 49 as the characteristic cam members rotate on the shaft 43.

In order to maintain the characteristic cam discs in a predetermined fixed position relative to one another, the cam disc 39 is provided with a slot 50 in which is positioned a set screw 51 threadedly engaging the disc 40. By adjusting the distance between the step of one cam disc with respect to the step of the other cam disc, the duration of the flash may be controlled for any desired time interval.

Referring to the diagrammatic Fig. 9 showing the circuit of the system as herewith presented, it will be noted that upon closing of the contacts 48 and 49, the flasher bulb is caused to become energized through circuit line B, C, D and current supply X, thence through E, F and G to the contacts 48 and 49. The motor unit receives its source of energy through H, switch S, the rotating switch members 32 and 36 to the ground or negative side of the source of electrical supply, through E to the field coil 10. A condenser P is shunted across the circuit at E and H.

For convenience in assemblage of this motor unit, there is provided the usual casing or housing 60 provided with a cover member 61. The contact posts 63, 63 and 64 are supported and carried by the plate 45 which in turn supports through suitable means, the unipolar field coil 10 and the rotating element comprising the present invention.

Having thus described this invention, it is to be understood that certain variations in the arrangement and combination of the respective operating elements may be made without departing from the spirit and scope of this invention as hereinafter claimed.

What we claim is:

1. A motor unit comprising a single air core field coil, a shaft mounted exterior of said coil, a rotor carried by said shaft and a magnet adapted to maintain said rotor in a definite position with respect to said coil whereby the greatest starting torque is available when said motor is started.

2. A speed control mechanism for making and breaking a switch in the circuit of the current supply to a motor unit comprising a unitary structure including a bushing, arms extending outwardly from said bushing, means engaging one of said arms adapted to maintain said speed control mechanism eccentric to a shaft when at rest and means on the other arm adapted to control the concentric variation of said bushing to a shaft during the period of rotation of the shaft thereby opening and closing said switch.

3. A speed control device for making and breaking a switch in the circuit of the current supply to a motor unit comprising a member adapted to surround a shaft, integral arms extending outwardly from said member, one of said arms maintaining said member eccentric to a shaft when at rest to close the circuit and means on the other arm for controlling the concentric variation of said member surrounding the shaft to open the circuit.

4. A motor unit comprising a single air core field coil, a rotor having its axis mounted exterior to said coil and a magnet adapted to position said rotor with respect to said coil to obtain the maximum starting torque for said motor.

5. A motor unit comprising a single air core field coil, a rotor having its axis mounted exterior to said coil, means adapted to control the speed to said rotor and a magnet adapted to position said rotor with respect to said coil to obtain the maximum starting torque for said motor.

6. A motor unit comprising a single air core field coil, a shaft mounted exterior of said coil, a rotor carried by said shaft, means on said shaft adapted to control the speed of said rotor and a magnet adapted to position said rotor with respect to said coil to obtain the maximum starting torque for said motor.

7. A motor unit comprising a single air core field coil, a rotor having its axis mounted exterior to said coil, means adapted to control the speed of said rotor, a permanent magnet adapted to position said rotor with respect to said coil to obtain the maximum starting torque for said motor, said rotor and speed control means therefor being removable as a unit without disturbing said field coil.

8. A motor unit comprising an air core field coil, a rotor having its axis mounted exterior to said coil, adjustable means for controlling the speed of said rotor and a permanent magnet adapted to position said rotor with respect to said coil to obtain the maximum starting torque for said motor.

9. A motor unit including a single air core field coil, a shaft exterior to said coil, a rotor carried by said shaft adapted to rotate into said field coil, means adapted to control the speed of said rotor and a permanent magnet adapted to position said rotor with respect to said coil to obtain the maximum starting torque for said motor.

SIDNEY C. VINCENT.
FREDERICK C. VOLKMAN.